(12) United States Patent
Camhi (10) Patent No.: US 11,499,483 B2
(45) Date of Patent: Nov. 15, 2022

(54) METHOD AND A DEVICE FOR ESTIMATING THE HEALTH OF A POWER PLANT OF AN AIRCRAFT HAVING AT LEAST ONE ENGINE AND A CLOGGABLE FILTER FILTERING AIR UPSTREAM FROM THE ENGINE

(71) Applicant: AIRBUS HELICOPTERS, Marignane (FR)

(72) Inventor: Emmanuel Camhi, Fuveau (FR)

(73) Assignee: AIRBUS HELICOPTERS, Marignane (FR)

( * ) Notice: Subject to any disclaimer, the term of this patent is extended or adjusted under 35 U.S.C. 154(b) by 118 days.

(21) Appl. No.: 16/851,612

(22) Filed: Apr. 17, 2020

(65) Prior Publication Data
US 2020/0332723 A1 Oct. 22, 2020

(30) Foreign Application Priority Data
Apr. 17, 2019 (FR) ...................... 1904084

(51) Int. Cl.
*F02C 9/00* (2006.01)
*B64F 5/60* (2017.01)
(Continued)

(52) U.S. Cl.
CPC ............... *F02C 9/00* (2013.01); *B64C 27/04* (2013.01); *B64D 33/02* (2013.01); *B64D 45/00* (2013.01);
(Continued)

(58) Field of Classification Search
CPC ........... F02C 9/00; B64C 27/04; B64D 33/02; B64D 45/00; B64D 2045/0085;
(Continued)

(56) References Cited

U.S. PATENT DOCUMENTS

2009/0261208 A1  10/2009  Belyew
2013/0204468 A1  8/2013  Camhi
(Continued)

FOREIGN PATENT DOCUMENTS

EP  2623746 A1  8/2013
EP  2623747 A1  8/2013
(Continued)

OTHER PUBLICATIONS

French Search Report for French Application No. FR 1904084, Completed by the French Patent Office, dated Dec. 10, 2019 9 pages.

*Primary Examiner* — James M McPherson
*Assistant Examiner* — Kyle J Kingsland
(74) *Attorney, Agent, or Firm* — Brooks Kushman P.C.

(57) ABSTRACT

A checking method for checking a power plant of an aircraft, the power plant comprising at least one engine and an air inlet for feeding said at least one engine with air, the power plant including a cloggable filter filtering the air upstream from the engine. An aircraft power check is performed by: determining, in flight or on the ground, the current power actually being developed by the engine without making any allowance for any power losses resulting from the engine being installed in the aircraft or from a level of clogging of the filter, the aircraft power check being considered as being successful when the current power is greater than or equal to a guaranteed minimum power.

12 Claims, 1 Drawing Sheet

(51) Int. Cl.
  *B64D 45/00* (2006.01)
  *B64C 27/04* (2006.01)
  *B64D 33/02* (2006.01)
(52) U.S. Cl.
  CPC ........ *B64F 5/60* (2017.01); *B64D 2045/0085* (2013.01); *F05D 2220/323* (2013.01); *F05D 2260/607* (2013.01); *F05D 2270/42* (2013.01); *Y02T 50/60* (2013.01)
(58) Field of Classification Search
  CPC ................ B64F 5/60; F05D 2260/607; F05D 2220/323; F05D 2270/42; Y02T 50/60
  See application file for complete search history.

(56) References Cited

U.S. PATENT DOCUMENTS

| | | |
|---|---|---|
| 2014/0200844 A1 | 7/2014 | Evrard et al. |
| 2016/0347479 A1 | 12/2016 | O'Neil et al. |
| 2018/0297718 A1* | 10/2018 | Adibhatla .............. G07C 5/008 |
| 2019/0390564 A1* | 12/2019 | Parsons ................ F01D 21/003 |

FOREIGN PATENT DOCUMENTS

| | | |
|---|---|---|
| EP | 3309079 A1 | 4/2018 |
| EP | 3064680 A1 | 10/2018 |

\* cited by examiner

METHOD AND A DEVICE FOR ESTIMATING THE HEALTH OF A POWER PLANT OF AN AIRCRAFT HAVING AT LEAST ONE ENGINE AND A CLOGGABLE FILTER FILTERING AIR UPSTREAM FROM THE ENGINE

CROSS-REFERENCE TO RELATED APPLICATIONS

This application claims priority to French patent application No. FR 19 04084 filed on Apr. 17, 2019, the disclosure of which is incorporated in its entirety by reference herein.

BACKGROUND OF THE INVENTION

(1) Field of the Invention

The present invention relates to a method and to a device for estimating the health of a power plant of an aircraft having at least one engine and a cloggable filter filtering air upstream from the engine. The term "cloggable" means that, in use, the filter can become at least partially clogged by a foreign body.

(2) Description of the Related Art

The invention is thus situated in the technical field of power plants for vehicles, in particular for an aircraft, and more particularly for a rotorcraft.

Specifically, an aircraft is usually provided with a power plant having at least one engine fed with air from an air inlet. For example, a rotary wing aircraft has a power plant provided with at least one engine for driving a rotary wing in rotation. For example, a helicopter is often provided with at least one turboshaft engine, sometimes referred to as a "gas turbine".

Also, each engine is dimensioned to be capable of being used at at least one power rating, each power rating associating a level at which power is developed with a duration of utilization. Among known ratings, mention may be made in particular of:

the take-off rating, which associates a maximum take-off power (TOP) with a duration of utilization of about 5 minutes (min) to 10 min; and the maximum continuous rating associating a maximum continuous power (MCF) with an unlimited utilization duration.

Furthermore, on a multi-engine aircraft, there also exist supercontingency ratings, which ratings are used when one of the engines fails. These supercontingency ratings may comprise:

a first contingency rating that associates a "one engine inoperative" (OEI) supercontingency power with a duration of utilization of about 30 seconds, written 30 sec OEI;

a second contingency rating associating a maximum contingency power with a duration of utilization of about two minutes, written 2 min OEI; and a third contingency rating associating an intermediate contingency power with a duration of utilization extending to the end of a flight after one engine has failed, for example, written cont. OEI.

In parallel, it is common to determine the number of hours of flight that an aircraft engine can operate before it needs to be overhauled. This number of flight hours is known as the time between overhauls (TBO).

Under such conditions, an engine manufacturer uses calculation or testing to determine a minimum guaranteed power for each regime, which minimum guaranteed power corresponds to the minimum power that the engine must still be capable of delivering when it has reached said TBO number of flight hours, with such an engine being referred to below as an "aged" engine, for convenience.

The performance of an aircraft thus depends on the power that can be developed by each engine. For example, the takeoff weight and/or payload and/or cruising speed, in particular, of an aircraft are all dependent on the power developed by each engine in the various regimes. Nevertheless, the power developed by an engine tends to decrease over time. The powers developed by a new engine are generally greater than the minimum guaranteed powers in order to make provision for the loss of power due to ageing. Under such circumstances, in order to guarantee the required performance independently of the ageing of the engines of an aircraft, the performance of an aircraft may be calculated on the basic of the minimum guaranteed powers even though, in the presence of new engines, the performance of the aircraft could be evaluated as being higher.

Also, "contaminants" such as dust, sand, snow, and ice are liable to penetrate into an air inlet, which air inlet serves to feed oxidizer to an engine situated downstream therefrom in the air flow direction. These contaminants are prone to degrade the engine. Under such circumstances, an air inlet may be fitted with an air filtering system in order at least to limit the ingestion of contaminants. An air filtering system is referred to below more simply as a "filter". For example, a filter may comprise a grid, a vortex filter, or indeed an inlet barrier filter. A filter gives rise to engine installation losses that are a function of the degree to which the filter is clogged, such installation losses tending to reduce the power that can be developed by an engine being fed with air through the filter. In conservative manner, the performance of an aircraft is sometimes determined not only on the assumption that an engine has aged, but also on the assumption that the filter is clogged.

Such a conservative approach is advantageous insofar as the certified performance of the aircraft is guaranteed regardless of the state of the filter. Nevertheless, during its lifetime, the aircraft may have a margin of power that is available, but of which no use is made in terms of performance.

Furthermore, certain certification regulations may require means for verifying that each engine is capable of delivering the minimum guaranteed powers that enable the aircraft to reach the certified performance levels.

In order to verify that an engine is functioning correctly, an engine health check is performed in order to ensure that the engine develops powers that are greater than or equal to the guaranteed minimum powers. If so, the engine is capable of delivering the powers required for reaching the certified performance levels. If not, maintenance action needs to be undertaken.

An engine health check can be performed in various ways. For example, the performance of a turboshaft engine may be checked by monitoring two parameters.

A first monitoring parameter may be a temperature of the engine, which temperature may be the temperature TET of gas at the inlet to a high pressure turbine of a gas generator, or the temperature T45 of the gas at the inlet to a free turbine.

Furthermore, another monitoring parameter relates to the engine power delivered by the turboshaft engine or to the engine torque of the turboshaft engine, where the engine power and the engine torque of the turboshaft engine are mutually dependent. Nevertheless, the speed of rotation of the gas generator of the engine, known as Ng by the person skilled in the art, is also linked with the power delivered by the engine, so a second monitoring parameter that can be used is this speed of rotation Ng of the gas generator.

Consequently, and by way of example, checking the health state of the engine may consist in:

measuring the value of the first monitoring parameter and then verifying that the value of the current power of the engine is greater than or equal to the value of the minimum guaranteed power that an aged engine would deliver under the name conditions; or measuring the value of the second monitoring parameter and then verifying that the value of the current power of the engine is greater than or equal to the value of the minimum guaranteed power that an aged engine would deliver under the same conditions.

The minimum guaranteed powers are established by testing an engine on a test bench. In order to compare the results of measurements taken in flight with measurements taken on a test bench, in-flight measurement conditions may be optimized in order to come close to measurement conditions on a test bench. Measurements taken on a test bench are taken under temperature conditions that are stable. Under such circumstances, in order to perform an engine health check in flight, the aircraft may be put into a particular stage of flight, such as level flight at an altitude and a speed that are stabilized for several minutes. The pilot can then launch a manual action requiring an engine health check to be performed, or indeed such an engine health check may be performed automatically when the required conditions are present.

Also, in order to evaluate the current power being developed by an engine for comparison with a minimum guaranteed power as measured on a test bench, installation losses can be taken into account. Installation losses give rise to power losses that may be due, for example, to head losses in the air inlets of the engines or indeed to pressure distortions, or even to the exhaust nozzles. Furthermore, installation losses include power losses due, in particular, to power being taken off from the engine by accessories and/or to the altitude of the aircraft and/or to the outside temperature.

These installation losses tend specifically to reduce the power developed on an outlet shaft of an engine that is installed on an aircraft. The term "installation" losses thus refers to the losses of power that are encountered. The loss of power that corresponds to installation losses may therefore need to be evaluated in order to determine the current power as such of the engine. The current power of the engine that is to be compared with a minimum guaranteed power can thus be equal to the sum of the power loss plus the power actually developed on an outlet shaft of the engine installed on an aircraft and as measured in flight.

In the presence of an air inlet without a filter, the power loss due to the installation losses and, in particular, to the air delivery system can be estimated accurately. In contrast, in the presence of a filter, accurate estimation of the power loss is more difficult since this power loss depends on the degree to which the filter is potentially clogged.

With a first strategy, clogging can be evaluated by measuring pressures upstream and downstream from the filter.

With a second strategy, the power loss may be established by testing on the basis of a filter that is not clogged. The power loss resulting from a clean filter is less than the power loss resulting from a clogged filter. This second strategy thus errs on the safe side in that it tends to minimize the current power as such of the engine, since the current power is calculated by adding the estimated power loss to the measured power. In contrast, when the current power is deemed to be too low as a result of a clogged filter and not as a result of an engine being too worn, this second strategy can lead to maintenance action being taken on the engine prematurely.

Document US 2016/0347479 proposes another method of monitoring on the ground an engine of an aircraft that has a barrier filter. In that method, a first engine health check is performed while considering that the barrier filter is clogged. If the results of that first engine health check are not satisfactory, a second engine health check is performed while opening a bypass air inlet and considering that the aircraft no longer has a barrier filter.

Document EP 3 309 079 describes a method for obtaining power information.

Document EP 2 623 746 describes a method of optimizing the performance of an aircraft.

Document FR 3 064 680 describes a method of verifying the maximum power available from a turbine engine of an aircraft having at least two turbine engines.

Document EP 2 623 747 relates to a method of performing a health check on a turboshaft engine.

Document US 2009/261208 describes an aircraft having a barrier filter that is cleanable.

BRIEF SUMMARY OF THE INVENTION

An object of the present invention is thus to propose an alternative method for estimating the health of a power plant of an aircraft having at least one engine and a cloggable filter filtering air upstream from the engine.

The invention thus provides a checking method for checking a power plant of an aircraft, said power plant comprising at least one engine and an air inlet for feeding said at least one engine with air, said power plant including a cloggable filter filtering the air upstream from said engine.

The method includes a step of performing an aircraft power check by using the following operations:

determining, in flight or on the ground, the power actually being developed by said engine within the aircraft and referred to as "current power", without making any allowance for any power loss resulting from said engine being installed in said aircraft or for any level of clogging of said filter, i.e. without evaluating any power loss resulting from said engine being installed in said aircraft or any level of clogging of said filter; and determining that said current power is greater than or equal to a stored value for guaranteed minimum power, said aircraft power check being considered to be successful when said current power is greater than or equal to said guaranteed minimum power.

In the presence of a multi-engine aircraft, the method may be applied to each engine, one after another.

Under such circumstances, the method provides for checking the power of the aircraft, which should not be confused with checking the power of an engine. Such an aircraft power check seeks to evaluate the power being developed by the engine as installed under the actual clogging conditions of the filter, and not the power the engine could develop in isolation. When performing an aircraft power check, and thus when calculating the current power, no allowance is made for these clogging conditions, or more generally installation power losses such as a power loss resulting from power being taken off from the engine. An aircraft power check does not recalibrate power measurements in order to compare them with measurements taken on a test bench. This characteristic is found to be advantageous, since evaluating a power loss, e.g. resulting from a cloggable barrier filter, is difficult to do accurately and in a manner that is not conservative, i.e. that does not err on the safe side.

Unlike an engine health check, the current power developed on an aircraft by an engine is evaluated without making any allowance for installation losses. This aircraft power check does not measure the power developed by an engine in conservative manner, but measures the real current power, e.g. at the outlet from the engine as installed on the aircraft. If the current power is greater than or equal to the guaranteed minimum power for the current regime, it follows that the engine is necessarily developing power in compliance with the guaranteed minimum power regardless of whether or not the filter is clogged.

The aircraft power check may be performed at a predetermined frequency, e.g. once every 25 hours under the control of power-check computer on board the aircraft, it may be performed on an order from a pilot, or indeed it may be performed continuously during a flight.

The aircraft power check may be performed not only in the presence of a barrier filter, but also in the presence of a vortex filter or of a grid, for example. The aircraft power may also be checked regardless of the type of exhaust nozzle being used, once again because the aircraft power is checked by taking account of the power actually being developed within the aircraft.

The method may also include one or more of the following characteristics, taken singly or in combination.

For example, the step of determining the current power may comprise the following operations: measuring engine torque, calculating the current power as being equal to the product of the engine torque multiplied by the speed of rotation of the engine, said speed of rotation of the engine being equal to the speed of rotation of an outlet shaft of said engine or equal to the speed of rotation of a shaft rotating at the same speed as the outlet shaft or to the product of a stored proportionality coefficient multiplied by the speed of rotation of a rotary member that is mechanically linked to the outlet shaft.

The term "outlet shaft" designates a shaft of the engine for connecting to an element that does not form part, of the engine and that is driven by the engine.

By way of illustration, the torque exerted on an outlet shaft driven by the free turbine of a turboshaft engine and the speed of rotation of the outlet shaft can be measured in order to calculate the current power by performing a multiplication. Alternatively, on a helicopter, it is possible to measure said torque and the speed of rotation of the main rotor, and to multiply that speed of rotation by a coefficient corresponding to the speed reduction ratio that exists between the speed of rotation of the outlet shaft and the speed of rotation of the main rotor.

In another aspect, the step of determining that said current power is greater than or equal to a stored guaranteed minimum power may comprise the following operations: calculating an aircraft power indicator that, is a function solely of said current power and of a stored guaranteed minimum power, said aircraft power check being considered as succeeding or failing as a function of a value of said aircraft power indicator relative to zero.

Under such circumstances, a new indicator referred to as the "aircraft power indicator" is calculated. This aircraft, power indicator is a function at least of the difference between the current power and the guaranteed minimum power at the current flight operating point.

For example, this aircraft power indicator may be expressed as a power, being equal to the current power Pcour minus the guaranteed minimum power Pmini, i.e.: Pcour–Pmini. In another possibility, this aircraft power indicator may be expressed as a ratio, being equal to the difference of the current power minus the guaranteed minimum power, with the difference being divided for example by the guaranteed minimum power, i.e.: (Pccur–Pmini)/Pmini. Constants may possibly be involved in calculating this aircraft power indicator.

With such an aircraft power indicator based on the current power minus the guaranteed minimum power, the aircraft power indicator must be positive or zero for the aircraft power check to be successful. The aircraft power indicator can be positive or zero under the following circumstances:

the engine is not new, but has a level of power that is greater than or equal to the guaranteed minimum power, and the filter is clean; or for example the filter is clogged but the engine has a power level that is high enough to compensate for largo head losses through the filter.

The method does not require real-time variation in the clogging of the filter to be measured accurately, where such measurement is extremely complicated. By measuring the current power actually being developed by the engine in the aircraft, so long as the aircraft power indicator is positive or even zero, that means that clogging might be present, but that the power losses that result therefrom are compensated by the operating margins of the engine.

In another example, the aircraft power indicator may be expressed as a power, being equal to the guaranteed minimum power Pmini minus the current power Pcour, i.e.: Pmini–Pcour. In another possibility, this aircraft power indicator may be expressed as a ratio, being equal to the difference of the guaranteed minimum power minus the current power, with the difference being divided for example by the guaranteed minimum power, i.e.: (Pmini–Pcour)/Pmini. Constants may possibly be involved in calculating this aircraft power indicator. For the power of the aircraft to be checked successfully, the aircraft power indicator then needs to be negative.

In one aspect, the method may comprise the following steps:

determining that said aircraft power check has failed when said current power is less than said guaranteed minimum power; and if an aircraft power check fails, cleaning said filter and then performing a new aircraft power check.

Margins may be taken into account so that the flight of the aircraft can be completed in the event that an in-flight aircraft power check gives results that are not satisfactory. For example, the guaranteed minimum power that is compared with the current power may include such a margin.

At the end of a flight, the method may provide for the filter to be cleaned. Specifically, a check of the power of the aircraft might fail because of a filter that is clogged. After the filter has been cleaned, it is possible to perform a new aircraft power check.

In one aspect, the method may include the following operations:

if the new aircraft power check fails, performing an engine health check while allowing for a power loss resulting at least from said filter, or else while opening an air bypass channel to feed air to said engine without filtering; and if the engine health check fails, removing said engine from the aircraft.

If, after cleaning the filter, the new aircraft power check also fails, the method may include a step of forming a conventional engine health check, this time while allowing for installation losses, or possibly while opening an air bypass channel. This characteristic makes it possible to determine whether the failure of the aircraft power check is a result of installation losses or of the engine being worn.

Alternatively, or in addition, a non-cloggable bypass channel may be opened.

Optionally, the engine health check may include a step of calculating an engine health index that is a function of said current power plus the absolute value of said power loss minus said guaranteed minimum power. This health index must be positive for the engine health check to be successful.

In another aspect, if an engine health check succeeds, the method then includes a generation step for generating flight authorization for said aircraft complying at least with predetermined performance of the aircraft that is calculated on the basis of at least the guaranteed minimum power for said engine and on the basis of a power loss corresponding to the filter being clogged, or where applicable to a head loss in a bypass channel.

By way of example, such a predetermined performance may comprise any of the following: the takeoff weight of an aircraft, its payload, its cruising speed, its range . . . .

If unsuccessful, maintenance action needs to be undertaken.

In contrast, if an aircraft power check succeeds, said method includes a generation step for generating flight authorization for said aircraft complying at least with predetermined performance of the aircraft that is calculated on the basis of at least one guaranteed minimum power for said engine and on the basis of a power loss corresponding to the filter not being clogged.

Unlike the prior art, the method then makes it possible to take advantage of all of the available power when the power of the aircraft is checked successfully. The performance of the aircraft, e.g., its on-board weight, can be improved significantly.

In addition to a method, the invention provides a power-check device for automatically checking a power plant of an aircraft, said power plant comprising at least one engine and an air inlet for feeding said at least one engine with air, said power plant including a cloggable filter filtering the air upstream from said engine.

The power-check device comprises a measurement system for measuring information representative at least of the current power actually being developed by said engine without evaluating any level of clogging of the filter, and power-check computer configured to apply the checking method.

For example, the measurement system comprises a torque meter arranged on an outlet shaft of the engine and a speed sensor arranged on the outlet shaft or on a member that is driven directly or indirectly by the outlet shaft.

The device may also have an outlet from the power-check computer enabling an operator to be informed of the results of the aircraft power check, and of the engine health check, if any. The power-check computer may also be in communication with a display configured to display said results.

The invention also provides an aircraft provided with a power plant, said power plant comprising at least one engine and an air inlet for feeding said at least one engine with air, said power plant including a cloggable filter filtering the air upstream from said engine. The aircraft includes such a power-check device.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements that are present in more than one of the figures are given the same references in each of them.

Figure 1:
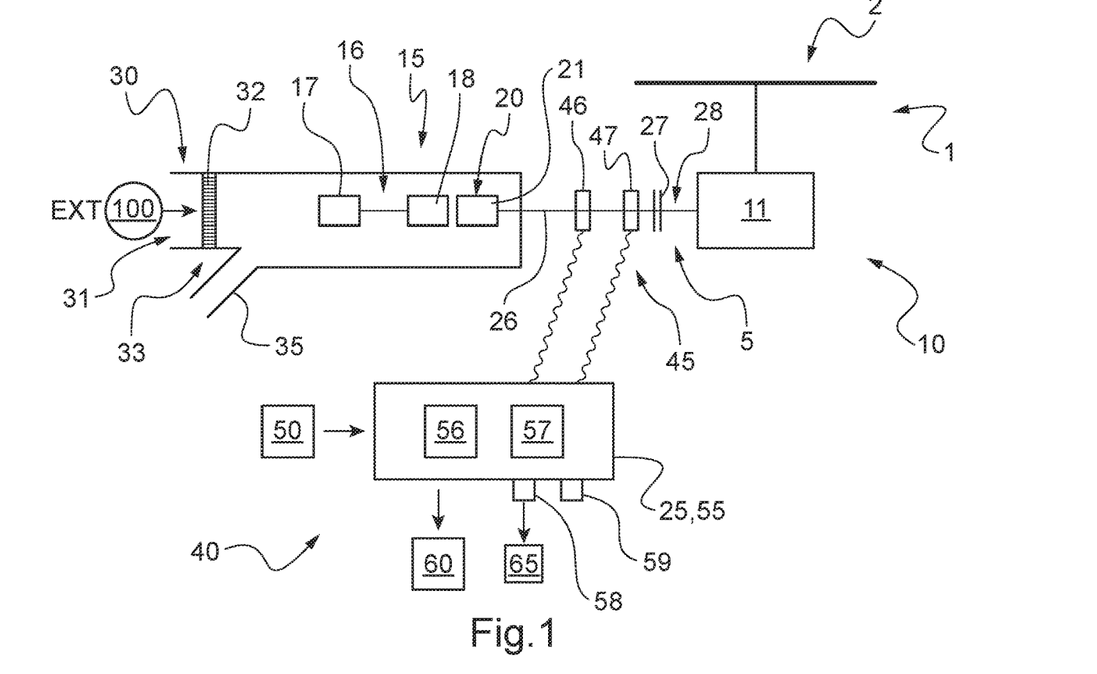
FIG. 1 is a diagrammatic view showing an aircraft of the invention.

FIG. 1 shows an aircraft 1 of the invention. The aircraft 1 shown is a rotorcraft having a rotary wing 2. Nevertheless, the invention may also be applied to vehicles of other types, and in particular, to aircraft of other types, for example.

The aircraft 1 has a power plant 10 including at least one engine 15. Each engine 15 has an outlet shaft 26 suitable for connection to a member that does not form part of the engine 15, with the engine 15 causing that member to move by means of the outlet shaft 26. For example, each outlet shaft 26 is connected by a mechanical transmission 5 to a main gearbox 11 that serves in particular to rotate the rotary wing 2. Such a mechanical transmission 5 may comprise at least one mechanical connector 27, at least one shaft 23.

In the embodiment shown, at least one engine 15 may be a turboshaft engine. Such a turboshaft engine comprises a gas generator 16 having at least one compressor 17 connected to at least one high pressure turbine 18. Downstream from the gas generator 16, the engine may comprise a low pressure assembly 20 including at least one free low pressure turbine 21, the low pressure assembly 20 driving the outlet shaft 26 either directly or via a mechanical system.

It is possible to envisage engines of other types, and for example a piston engine.

Furthermore, each engine 15 may be controlled by an engine computer 25, where such an engine computer 25 is commonly referred to as an engine control unit (ECU).

Independently of the number of engines 15 and of the nature of the engines 15, the power plant 10 includes an air feed system 30. Such an air feed system 30 includes at least one air inlet 31. The air inlet 33 takes in fresh air 100 coming from an external medium EXT situated outside the aircraft 1 in order to convey air to at least one engine 15, optionally via at least one duct 33.

Also, the aircraft 1 includes at least one filter 32, and for example a respective filter 32 for each air inlet. Such a filter 32 is arranged upstream from an engine 15 and downstream from the air inlet in order to filter the air that has been taken in and that is being conveyed to the engine 15 in order to feed the engine with oxidizer. For example, a filter 32 extends across a duct 33 of the air feed system 30. A filter 32 is a cloggable filter, i.e. a filter that can become clogged to a greater or lesser extent by the contaminants it filters. A filter may then be a vortex filter, or indeed a barrier filter, these examples not being limiting and being given by way of example.

The aircraft 1 is provided with a power-check device 40 that applies the method of the invention to check the operation of the aircraft 1.

The power-check device 40 may comprise a measuring system 45 for measuring information relating at least to the current power Pcour being developed by the installed engine 15 and independently of any level of clogging of the filter 32 or indeed in general manner independently of any installation losses.

The measuring system 45 may comprise first and second sensors respectively measuring the torque exerted on a shaft and information that enables the speed of the shaft to be obtained.

For example, a first sensor is in the form of a torque meter 46. Such a torque meter 46 is optionally positioned and configured to measure the torque being exerted on the outlet shaft 26.

Also, a second sensor 47 may comprise a position sensor and a differentiator serving to obtain a speed by differentiating the position measurement, or a speed sensor, or an accelerometer and an integrator enabling a speed to be obtained by integrating the acceleration measurement. A second sensor 47 may be arranged on the outlet shaft 26. Alternatively, a second sensor 47 may be arranged on a shaft that rotates together with the outlet shaft 26 and at the same speed as the outlet shaft 26, or indeed on a member such as the rotary wing 2 or a member of the main gearbox 11 that is driven at least by the outlet shaft 26, or indeed on a member of the engine that is mechanically linked to the outlet shaft 26.

In another aspect, the power-check device 40 includes power-check computer 55 configured to apply the method of the invention. In particular, the power-check computer 55 may comprise at least one processor 56 with at least one memory 57, at least one integrated circuit, at least one programmable system, and/or at least one logic circuit, these examples not limiting the scope to be given to the term "computer". Optionally, the power-check computer 55 and the engine computer 25 form a single entity. The power-check computer 55 may comprise a plurality of computers cooperating with one another.

The power-check device 40 may include an activation control 50 suitable for being operated by a human, such as a button, a touchscreen. The activation control 50 is connected to the power-check computer 55 via a wired or wireless link so that, when it is operated, a signal is generated that is transmitted to the power-check computer 55 in order to request application of the method of the invention.

Also, the power-check device 40 may include a display 60 connected to the power-check computer 55 by a wired or wireless link. The power-check computer 55 may generate a signal that is transmitted to the display 60 in order to request it to display the result of a check performed in accordance with the invention, e.g. on request from a pilot via a display control such as a button, a touchscreen . . . .

In one aspect, the power-check computer 55 may include an outlet of the antenna type 58 and/or of the connector type 59 so that an operator 65 can recover, if necessary, the result of a check performed in accordance with the invention, the result being stored in the power-check computer. Such a result may comprise the values of various measurements and/or information indicating whether an aircraft power check has succeeded or failed, and where applicable whether an engine health check has succeeded or failed.

Figure 2:
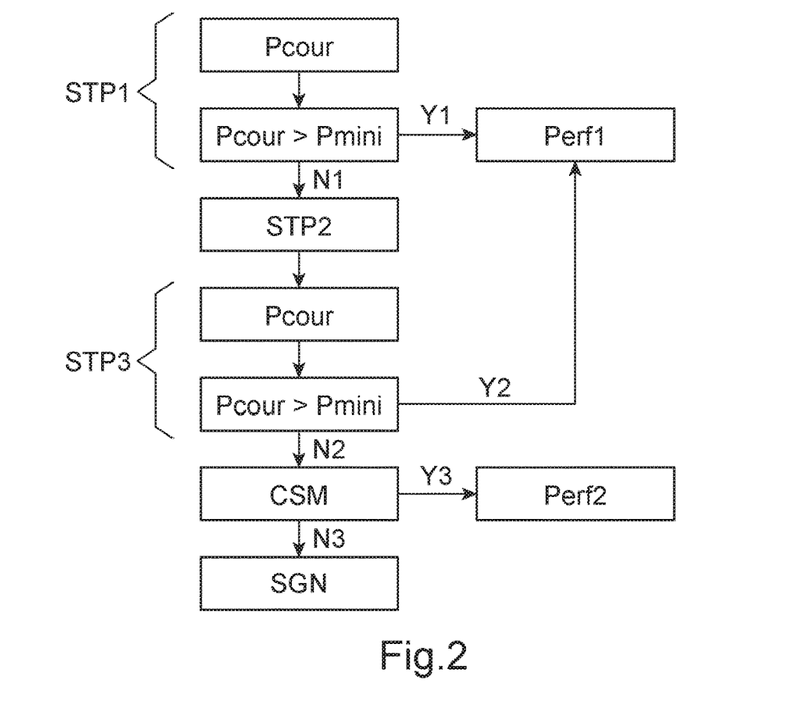
FIG. 2 is a diagram showing the method of the invention.

FIG. 2 shows an example of a method that can be performed by aircraft 1 as shown in FIG. 1. The method includes a step STP1 of performing a power check on the aircraft. For example, this step is controlled by a pilot using an activation control 50, or it is performed automatically by the power-check computer 55, e.g. at regular intervals, or during a predetermined stage of flight that can be identified in conventional manner.

During this step STP1, the power-check computer 55 acts in flight or on the ground to determine the current power Pcour being developed by the engine 15 at its outlet without taking account of installation losses, i.e. power losses that result from the engine 15 being installed in the aircraft 1 and from the filter 32 being clogged.

For example, a first sensor 46 measures engine torque at the outlet shaft 26 of the engine 15, and the second sensor 47 measures the speed of rotation of the outlet shaft 26. The power-check computer 55 deduces therefrom the current power Pcour, which is equal to the product of the engine torque multiplied by the speed of rotation of the outlet shaft 26.

In another example, a first sensor 46 measures engine torque at the outlet shaft 26 of the engine 15, and the second sensor 47 measures the speed of rotation of a working shaft 27 that is constrained to rotate with the outlet shaft 26. The power-check computer 55 deduces therefrom the current power Pcour, which is equal to the product of the engine torque multiplied by the speed of rotation of the working shaft 27.

In another example, a first sensor 46 measures engine torque at the outlet shaft 26 of the engine 15, and the second sensor 47 measures the speed of rotation of the rotary wing 2. The power-check computer 55 deduces therefrom the current power Pcour that is equal to the product of the engine torque multiplied by a stored proportionality coefficient and by the speed of rotation of the rotary wing 2. The current power may be measured at the same location as the guaranteed minimum power on a bench.

Whatever the way in which the current power is calculated, the power-check computer 55 determines whether the current power Pcour is greater than or equal to a stored value for the guaranteed minimum power Pmini and corresponding, where appropriate, to the current engine regime, possibly to within a margin.

Optionally, in order to determine whether the current power Pcour is greater than or equal to a guaranteed minimum power Pmini, the power-check computer 55 may calculate the value of an aircraft power indicator APC. This aircraft power indicator APC of the aircraft 1 should not be confused with an engine power indicator. This aircraft power indicator APC is a function solely of the current power Pcour and of the guaranteed minimum power Pmini, with the power-check computer 55 considering that the aircraft power check has succeeded or failed as a function of a value of the aircraft power indicator APC relative to zero.

In an example, the aircraft power indicator APC is equal to the current power minus the guaranteed minimum power: APC=Pcour−Pmini. The aircraft power check has succeeded when the power indicator APC is greater than zero or possibly is equal to zero.

In another example, the aircraft power indicator APC is equal to the current power minus the guaranteed minimum power divided by the guaranteed minimum power: APC=(Pcour−Pmini)/Pmini. The aircraft power check has succeeded when the power indicator APC is greater than zero or possibly is equal to zero.

In an example, the aircraft power indicator APC is equal to the guaranteed minimum power minus the current power: APC=Pmini−Pcour. The aircraft power check has succeeded when the power indicator AFC is less than zero or possibly is equal to zero.

In another example, the aircraft power indicator APC is equal to the guaranteed minimum power minus the current power divided by the guaranteed minimum power: APC=

(Pmini−Pcour)/Pmini. The aircraft, power check has succeeded when the power indicator APC is less than zero or possibly is equal to zero.

In all of the above situations, the aircraft power check is considered as being successful when the current power Pcour is greater than or equal to said guaranteed minimum power Pmini. As shown by arrow Y1, in the presence of the aircraft power being checked successfully, the method may include a generation step Perf1, e.g. using the power-check computer 55, to generate information allowing the aircraft 1 to fly in compliance with stored predetermined performance of the aircraft and calculated on the basis of at least one guaranteed minimum power for the engine 15 and on the basis of a power loss corresponding to the filter not being clogged. By way of example, this information may be displayed on the display 60 or transmitted to the operator via the antenna 53 and/or via the connector 59.

As shown by the arrow N1, in the presence of the aircraft power check failing, the method may include a step STP2 of cleaning the filter 32.

For example, the power-check computer 55 may generate a signal that is transmitted via the display 60 and/or via the antenna 58 and/or by the connector 59 indicating that the filter needs to be cleaned.

After cleaning, the method provides a step STP3 of performing a new aircraft power check.

The current power is calculated once more by the power-check computer 55 and it is compared with the guaranteed minimum power, using the operations described above.

As shown by arrow Y2, in the presence of the aircraft power now being checked successfully, the method may include a generation step Perf1, e.g. using the power-check computer 55, to generate information allowing the aircraft 1 to fly in compliance with the stored predetermined performance of the aircraft and calculated on the basis of at least one guaranteed minimum power for the engine 15 and on the basis of a power loss corresponding to the filter not being clogged.

As shown by arrow N2, in the presence of an aircraft power check failing, the method may include a step of performing an engine health check CSM while allowing for a loss of power resulting at least from the filter 32 and/or while opening the air bypass channel 35.

The engine health check may be performed in conventional manner.

Optionally, the power-check computer 55 calculates an engine health index SPC that is a function of said current power is Pcour plus said power loss Pinstall minus said guaranteed minimum power Pmini: EPC=Pcour+Pinstall−Pmini. Optionally, the engine health index EPC does not take said power loss of Pinstall into account, e.g. while the air bypass channel 35 is open.

As shown by arrow Y3, in the presence of engine health being checked successfully, i.e. in the presence of an engine health index EPC that is positive in this example, the method may include a generation step Perf2 in which the power-check computer 55 generates flight authorization for the aircraft 1 in compliance with predetermined aircraft performance calculated on the basis of the guaranteed minimum power Pmini of the engine 15 and of a power loss corresponding to the filter 32 being clogged.

As shown by arrow N3, in the presence of an engine health check that has failed, the power-check computer can generate a signal SGN in indicating that the engine needs to be removed in order to be overhauled.

In the presence of a plurality of engines, this method may be applied to each engine.

Naturally, the present invention may be subjected to numerous variations as to its implementation. Although several embodiments are described above, it should readily be understood that it is not conceivable to identify all possible embodiments exhaustively. It is naturally possible to envisage replacing any of the means described by equivalent means without going beyond the ambit of the present invention.

What is claimed is:

1. A checking method for checking a power plant of an aircraft, the power plant comprising at least one engine and an air inlet for feeding the at least one engine with air, the power plant including a cloggable filter filtering the air upstream from the engine, the engine having an output shaft suitable for connection to a member of the aircraft that does not form part of the engine, the method comprising:
performing an aircraft power check by using the following operations:
determining, in flight or on the ground, a current power (Pcour) actually being developed by the engine within the aircraft at the output shaft of the engine without making any allowance for an installation power loss resulting from the engine being installed in the aircraft and from any level of clogging of the filter; and
determining whether the current power (Pcour) is greater than or equal to a stored guaranteed minimum power (Pmini), the aircraft power check being considered to be successful when the current power (Pcour) is greater than or equal to the guaranteed minimum power (Pmini) and otherwise being considered to be failed;
in response to the aircraft power check being failed, generating a signal for cleaning the filter and then performing the aircraft power check a second time after the filter has been cleaned;
in response to the aircraft power check the second time being failed, performing an engine health check which makes allowance for the installation power loss, the engine health check being considered to be successful when the current power (Pcour) plus the installation power loss is greater than the guaranteed minimum power (Pmini) and otherwise being considered to be failed; and
in response to the engine health check being failed, generating a signal for removing the engine from the aircraft.

2. The method according to claim 1;
wherein the determining of the current power (Pcour) comprises the following operations: measuring engine torque, calculating the current power as being equal to the product of the engine torque multiplied by the speed of rotation of the engine, the speed of rotation of the engine being equal to the speed of rotation of the outlet shaft of the engine or equal to the speed of rotation of a shaft rotating at the same speed as the outlet shaft or to the product of a stored proportionality coefficient multiplied by the speed of rotation of a rotary member that is mechanically linked to the outlet shaft.

3. The method according to claim 1;
wherein the determining that the current power (Pcour) is greater than or equal to a stored guaranteed minimum power (Pmini) comprises the following operations: calculating an aircraft power indicator (APC) that is a function solely of the current power (Pcour) and of the stored guaranteed minimum power (Pmini), the aircraft power check being considered as succeeding or failing as a function of a value of the aircraft power indicator relative to zero.

4. The method according to claim 1;
wherein when an engine health check succeeds, the method includes a generation step for generating flight authorization for the aircraft complying at least with predetermined performance of the aircraft calculated on the basis of at least the guaranteed minimum power (Pmini) for the engine and on the basis of a second power loss corresponding to the filter being clogged.

5. The method according to claim 1;
wherein when an aircraft power check succeeds, the method includes a generation step for generating flight authorization for the aircraft complying at least with predetermined performance of the aircraft calculated on the basis of at least the guaranteed minimum power for the engine and on the basis of a second power loss corresponding to the filter not being clogged.

6. A power-check device for automatically checking a power plant of an aircraft, the power plant comprising at least one engine and an air inlet for feeding the at least one engine with air, the power plant including a cloggable filter filtering the air upstream from the engine, the engine having an output shaft suitable for connection to a member of the aircraft that does not form part of the engine, the power-check device comprising:
a measurement system for measuring, in flight or on the ground, at least one information representative of a current power (Pcour) actually being developed by the engine within the aircraft at the output shaft of the engine without evaluating an installation power loss resulting from the engine being installed in the aircraft and from any level of clogging of the filter; and
a power-check computer configured to perform an aircraft power check by determining whether the current power (Pcour) is greater than or equal to a stored guaranteed minimum power (Pmini), the aircraft power check being considered to be successful when the current power (Pcour) is greater than or equal to the guaranteed minimum power (Pmini) and being otherwise considered to be failed;
wherein the power-check computer is further configured to, when the aircraft power check fails, generate a signal indicating that the filter needs to be cleaned and then perform the aircraft power check a second time after the filter has been cleaned;
the power-check computer is further configured to, when the aircraft power check the second time fails, perform an engine health check which makes allowance for the installation power loss, the engine health check being considered to be successful when the current power (Pcour) plus the installation power loss is greater than the guaranteed minimum power (Pmini) and otherwise being considered to be failed; and
the power-check computer is further configured to, when the engine health check fails, generate a signal indicating that the engine needs to be removed from the aircraft.

7. The power-check device according to claim 6 wherein the measurement system and the power-check computer are on-board the aircraft.

8. A checking method for checking a power plant of an aircraft, the power plant comprising at least one engine and an air inlet for feeding the at least one engine with air, the power plant including a cloggable filter filtering the air upstream from the engine, the engine having an output shaft suitable for connection to a member of the aircraft that does not form part of the engine, the method comprising:
performing an aircraft power check by using the following operations:
determining, in flight or on the ground, a current power (Pcour) actually being developed by the engine within the aircraft at the output shaft of the engine without making any allowance for an installation power loss resulting from the engine being installed in the aircraft and from any level of clogging of the filter; and
determining whether the current power (Pcour) is greater than or equal to a stored guaranteed minimum power (Pmini), the aircraft power check being considered to be successful when the current power (Pcour) is greater than or equal to the guaranteed minimum power (Pmini) and otherwise being considered to be failed;
in response to the aircraft power check being failed, generating a signal for cleaning the filter and then performing the aircraft power check a second time after the filter has been cleaned;
in response to the aircraft power check the second time being failed, performing an engine health check while opening an air bypass channel that feeds air to the engine without filtering by the filter, the engine health check being considered to be successful when an engine power developed by the engine while the air bypass channel is opened is greater than the guaranteed minimum power (Pmini) and otherwise being considered to be failed; and
in response to the engine health check being failed, generating a signal for removing the engine from the aircraft.

9. The method according to claim 8;
wherein the determining of the current power (Pcour) comprises the following operations: measuring engine torque, calculating the current power as being equal to the product of the engine torque multiplied by the speed of rotation of the engine, the speed of rotation of the engine being equal to the speed of rotation of the outlet shaft of the engine or equal to the speed of rotation of a shaft rotating at the same speed as the outlet shaft or to the product of a stored proportionality coefficient multiplied by the speed of rotation of a rotary member that is mechanically linked to the outlet shaft.

10. The method according to claim 8;
wherein the determining that the current power (Pcour) is greater than or equal to a stored guaranteed minimum power (Pmini) comprises the following operations: calculating an aircraft power indicator (APC) that is a function solely of the current power (Pcour) and of the stored guaranteed minimum power (Pmini), the aircraft power check being considered as succeeding or failing as a function of a value of the aircraft power indicator relative to zero.

11. The method according to claim 8;
wherein when an engine health check succeeds, the method includes a generation step for generating flight authorization for the aircraft complying at least with predetermined performance of the aircraft calculated on the basis of at least the guaranteed minimum power (Pmini) for the engine and on the basis of a second power loss corresponding to the filter being clogged.

12. The method according to claim 8;
wherein when an aircraft power check succeeds, the method includes a generation step for generating flight authorization for the aircraft complying at least with predetermined performance of the aircraft calculated on the basis of at least the guaranteed minimum power for the engine and on the basis of a second power loss corresponding to the filter not being clogged.

\* \* \* \* \*